United States Patent [19]

Mikuni

[11] Patent Number: 5,543,788
[45] Date of Patent: Aug. 6, 1996

[54] MAP MANAGEMENT SYSTEM IN GEOGRAPHIC INFORMATION MANAGEMENT SYSTEM

[75] Inventor: Maki Mikuni, Kawasaki, Japan

[73] Assignee: Fujitsu Limited, Kawasaki, Japan

[21] Appl. No.: 337,191

[22] Filed: Nov. 7, 1994

Related U.S. Application Data

[63] Continuation of Ser. No. 987,267, filed as PCT/JP92/00892, Jul. 12, 1992 published as WO93/01555, Jan. 21, 1993, abandoned.

[30] Foreign Application Priority Data

Jul. 12, 1991 [JP] Japan ..................... 3-172566

[51] Int. Cl.$^6$ .................................... G08G 1/123
[52] U.S. Cl. .................... 340/990; 340/995; 340/286.14; 364/443; 364/444; 73/178 R; 345/120; 395/158
[58] Field of Search ..................... 340/990, 995, 340/988, 286.14; 364/444, 443, 449; 73/178 R; 395/158, 164; 345/119, 120

[56] References Cited

U.S. PATENT DOCUMENTS

| 4,675,676 | 6/1987 | Takanabe et al. ........... 340/990 |
| 4,843,569 | 6/1989 | Sawada et al. . |
| 4,951,212 | 8/1990 | Kurihara et al. ........... 340/990 |
| 4,974,170 | 11/1990 | Bouve et al. ............. 340/990 |
| 5,084,822 | 1/1992 | Hayami .................. 340/990 |
| 5,115,399 | 5/1992 | Nimura et al. ............ 340/990 |
| 5,229,947 | 7/1993 | Ross et al. ............... 340/990 |

FOREIGN PATENT DOCUMENTS

| 0051228 | 5/1982 | European Pat. Off. . |
| 0141508 | 5/1985 | European Pat. Off. . |
| 0330787 | 9/1989 | European Pat. Off. ............. 340/995 |
| 539146-A2 | 4/1993 | European Pat. Off. ............. 340/995 |
| 0174912 | 7/1989 | Japan .................... 340/995 |
| 403140816 | 6/1991 | Japan .................... 340/995 |
| 0231047 | 10/1991 | Japan .................... 340/995 |
| 403282580 | 12/1991 | Japan .................... 340/995 |

OTHER PUBLICATIONS

Tsutsui, et al., "System for Information Control of Water-–Supply, Sewerage Pipeline Drawings", Hitachi Hyoron, vol. 68, No. 9, Sep. 1986, Tokyo, Japan, pp. 749–754.

Supervised by Masao IRI, edited by Takeshi Koshizuka, "Arithmetic Geometry and Geographical Information Processing", Kyoritsu Shuppan, Sep. 10, 1986, pp. 199–203.

Primary Examiner—Brent A. Swarthout
Assistant Examiner—Nina Tong
Attorney, Agent, or Firm—Staas & Halsey

[57] ABSTRACT

A map management system in a geographic information management system which manages different kinds of maps with use of a computer. The map management system involves a map managing unit that prepares map databases for respective attributes, manages the databases, and allocates the attributes in accordance with an access right for the databases. A map processor accesses the databases through the map managing unit, retrieves necessary data from the databases, and displays the data. Different kinds of maps are separately stored in separate databases so that each map is separately retrievable. Several kinds of maps can be simultaneously retrieved. An access right is allocated for each of the separate databases depending on the importance of the attributes. According to the access right for a given database, the map managing unit determines whether data contained in the database is displayable, or displayable and correctable.

2 Claims, 6 Drawing Sheets

Fig.5

| Name of database | Access right |
|---|---|
| Map database DB1 | 10 (Reference and correction allowed) |
| Map database DB2 | 20 (Additional loading allowed) |

MAP MANAGEMENT SYSTEM IN GEOGRAPHIC INFORMATION MANAGEMENT SYSTEM

This application is a continuation of application Ser. No. 07/987,267, filed as PCT/JP92/00892, Jul. 12, 1992 published as WO93/01555, Jan. 21, 1993, now abandoned.

TECHNICAL FIELD

The present invention relates to a map management system in a geographic information management system employing a computer.

BACKGROUND ART

Geographic information management systems which employ a computer to manage a database of map information and its attribute data are known. Attribute data includes data of roads, houses, and place-names. This sort of computerized system can be employed by, for example, a municipal corporation which must control enormous amounts and types of geographic data. If individual departments of the municipal corporation separately control these data, it will be troublesome. Accordingly, all geographic data of the municipal corporation must be collectively controlled.

DISCLOSURE OF THE INVENTION

The present invention provides a map management system in a geographic information management system for managing different kinds of maps with use of a computer. The map management system includes:

a map managing unit that prepares map databases for respective attributes, manages the databases for every attributes, and allocates the attributes in accordance with an access right for the databases; and a basic map processor that accesses the databases through the map managing unit, retrieves necessary data from the databases, and displays the data.

different kinds of maps are separately stored in the databases, so that each map is retrieved from the databases, and also, several kinds of maps are simultaneously retrieved from the databases.

In a preferred embodiment, an access right is allocated for each of the databases depending on the importance of the attributes. According to the access right of a given database, the map managing unit determines whether the database is accessible and correctable, or additionally loadable.

BRIEF DESCRIPTION OF THE DRAWINGS

FIG. 5 shows a method of management by a map managing unit according to the present invention.

BEST MODE OF CARRYING OUT THE INVENTION

Before explaining the preferred embodiments of the present invention, a conventional art and its problem will be explained below.

Figure 1:
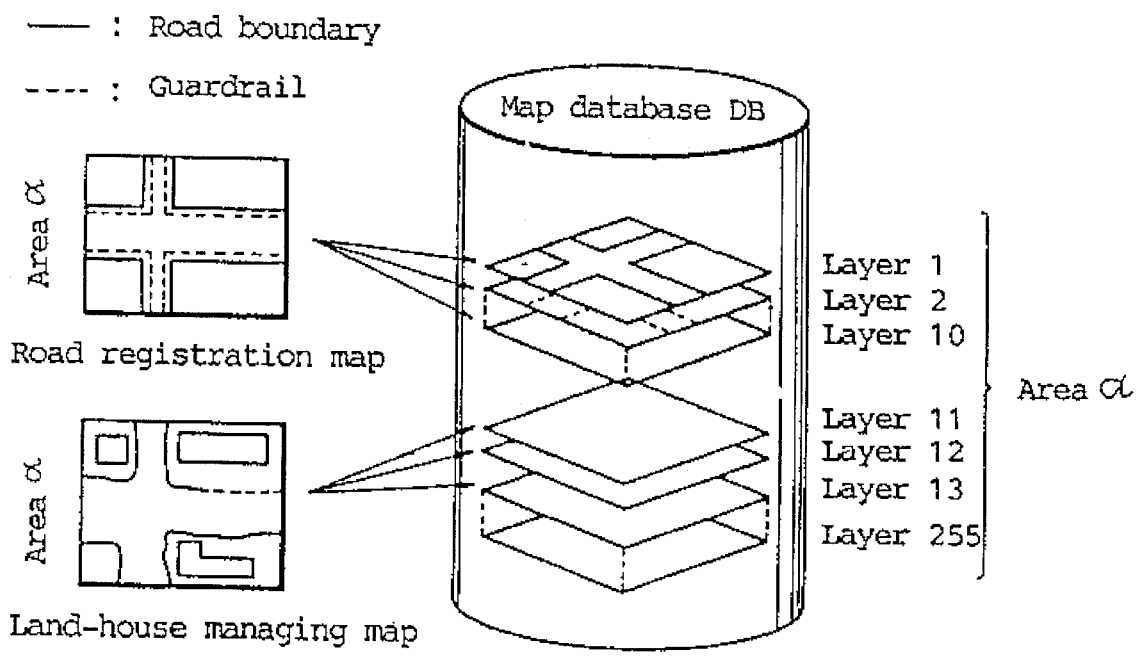
FIG. 1 shows a map database according to a conventional art.

FIG. 1 shows a map database in a geographic information management system employing a computer, according to the conventional art. The map database DB stores, for example, a road registration map and a land-house managing map of an area "α". The road registration map is composed of layers 1 to 10 in which the layer 1 shows roads, the layer 2 shows guardrails, and the layer 10 shows sewers. The land-house managing map is composed of layers 11 to 13 in which the layer 11 shows single houses and the layer 12 shows apartment houses. Similarly, maps of other areas are divided into attribute layers and stored in the map database DB. Each layer occupies a given memory space in the database. Namely, each layer occupies a given area in a data file for storing the geographic information.

This sort of computerized geographic information management system is used by municipal corporations such as city offices and work offices. These offices control an enormous amount of real estate information. To view the information of a required area with the system, a keyboard is used to specify the area and a required attribute, such as a road registration map or a land-house managing map of the area. Then, data is displayed through internal processes of the system.

To collectively manage different kinds of maps, the conventional art divides each map into layers and stores them in a map database, as shown in FIG. 1. When retrieving a piece of information of an area, all data related to the area must be loaded from the map database to a graphic display, and then a system user must select the required piece of information to display among layers of information. In this case, a controlled minimum unit is a layer.

Loading all data from the map database to the display may be useful when simultaneously retrieving a plurality of maps. It is inefficient and time consuming, however, when retrieving a single map.

An object of the present invention is to provide a map management system in a geographic information management system, capable of not only quickly retrieving a single map but also simultaneously retrieving a plurality of maps.

The present invention will be explained with reference to the drawings.

Figure 2:
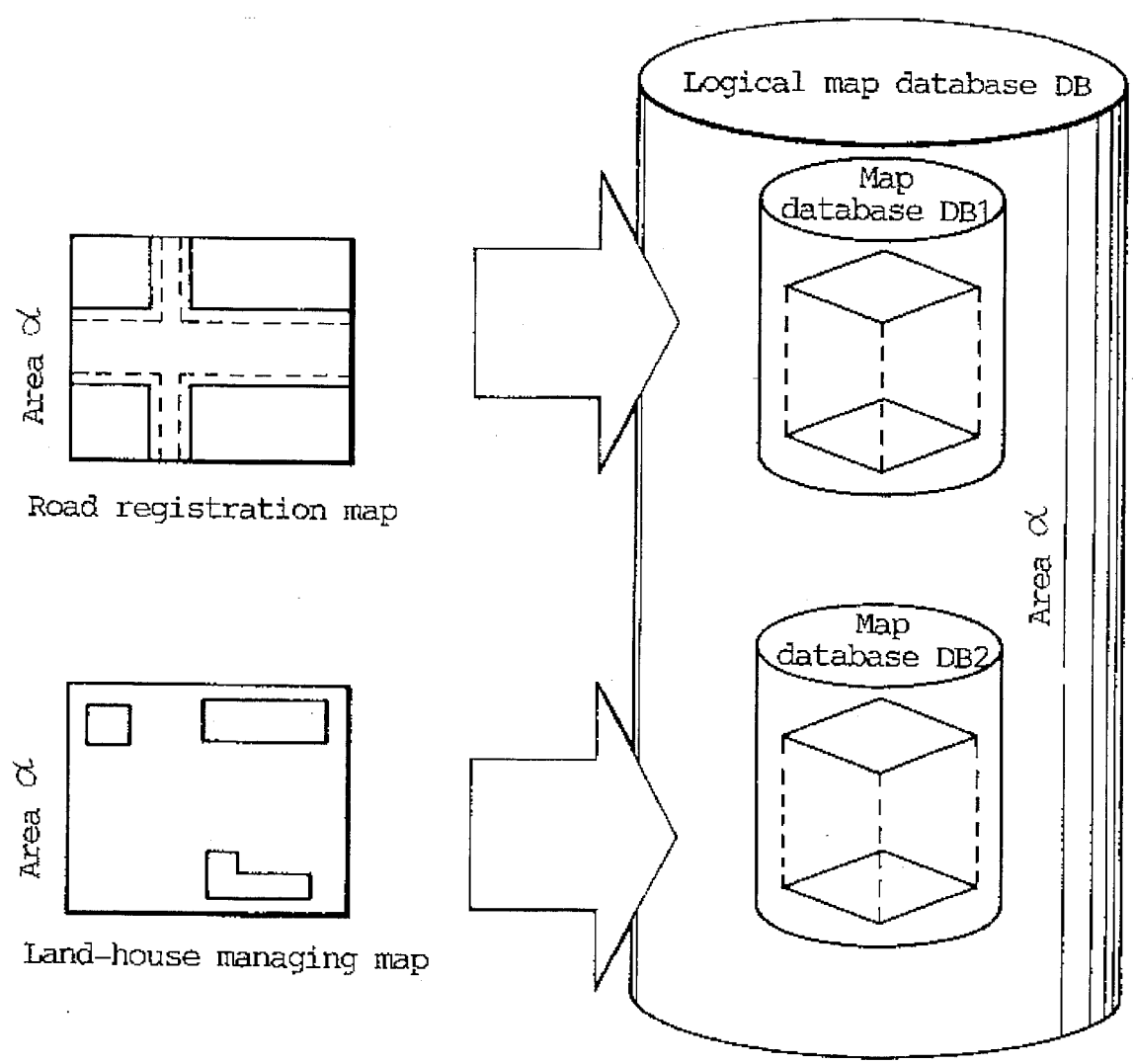
FIG. 2 shows a principle of the present invention.

FIG. 2 shows a principle of the present invention. The present invention employs a plurality of databases for storing different kinds of maps. For example, when storing a road registration map and a land-house managing map of an area "α", the present invention prepares a map database DB1 for storing the road registration map, and a map database DB2 for storing the land-house managing map. The databases DB1 and DB2 are collectively called as a logical map database DB.

Data in the map databases DB1 and DB2 are separately loadable, so that the maps are quickly retrieved one by one irrespective of the kinds of the maps.

Figure 3:
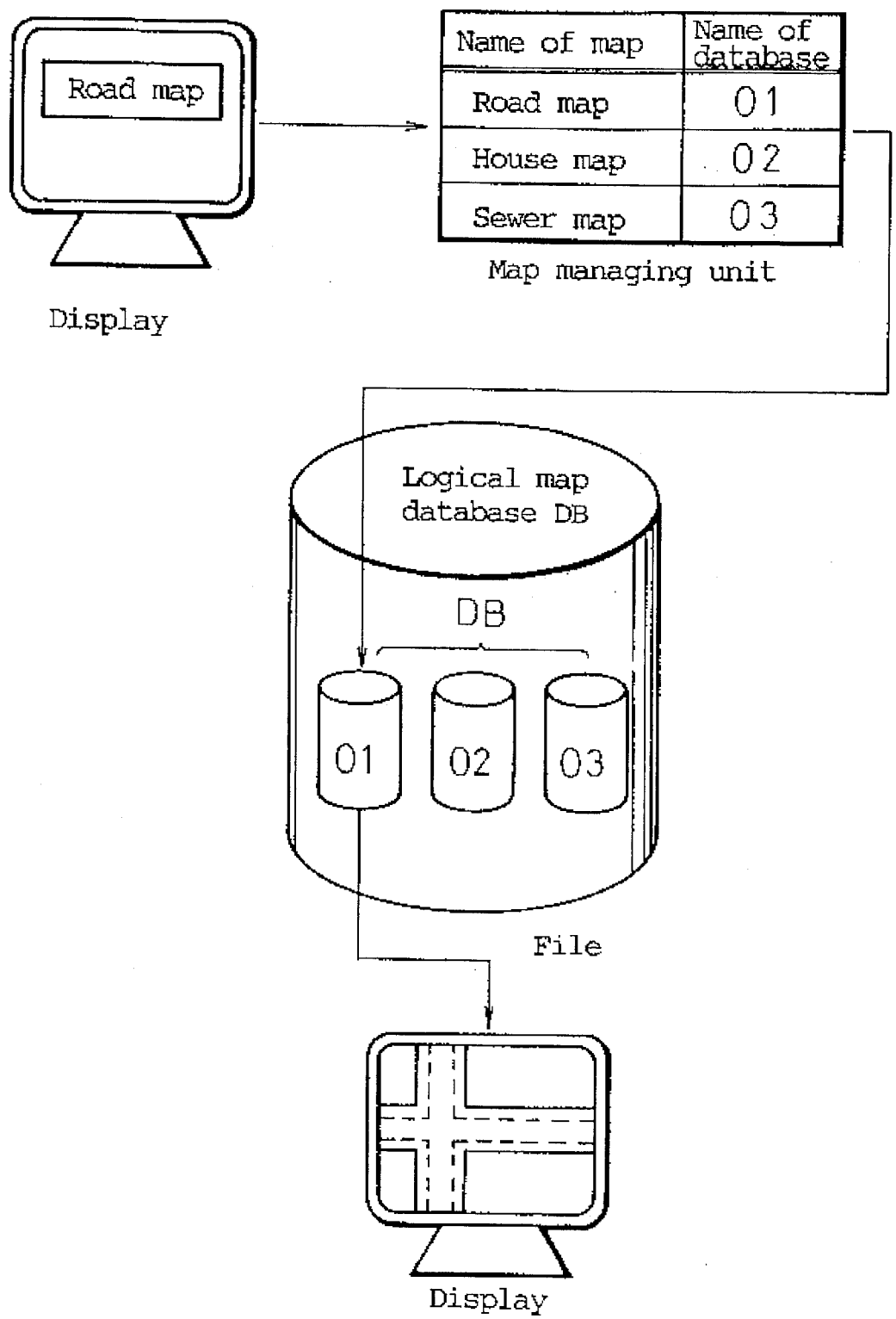
FIG. 3 shows a system according to the present invention.

FIG. 3 shows an embodiment of a geographic information management system employing a computer, according to the present invention. In FIG. 3, a display of the computer is displaying a road map. Map databases 01, 02, . . . are collectively called as a logical map database DB, which is formed in a file. The system incorporates a map managing unit, which will be explained later in detail. When the map managing unit is queried for the "road map," the map managing unit accesses the corresponding map database 01 in the logical map database DB, retrieves the required map therefrom, and displays the map. The map managing unit is not hardware but software, and is realized as "map management means" as a part of a program.

Figure 4:
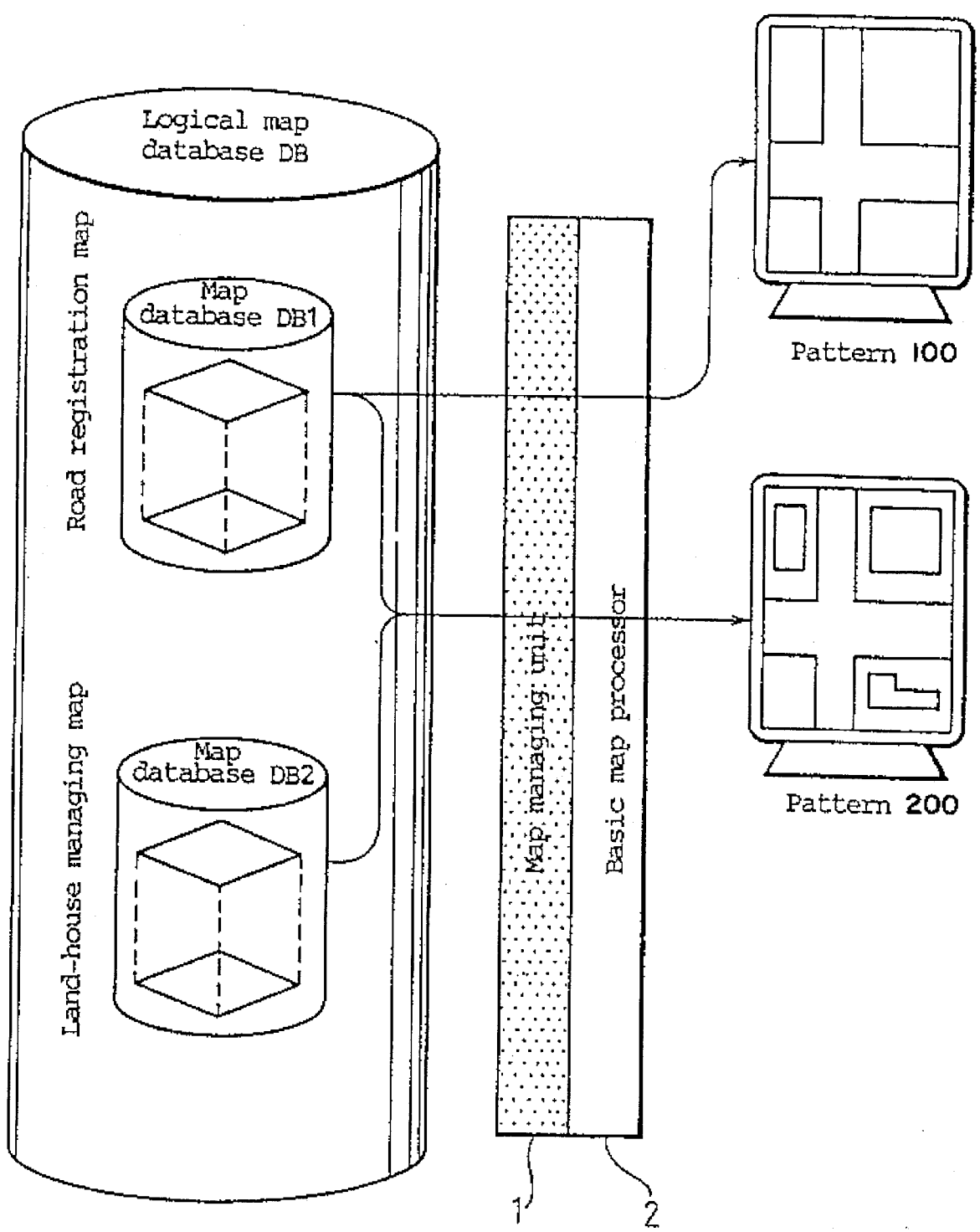
FIG. 4 shows an essential part of an embodiment of the present invention.

FIG. 4 shows an essential part of the embodiment of the present invention, and FIG. 5 explains a map managing unit of the embodiment of FIG. 4. As shown in FIG. 5 for the map managing unit 1 of FIG. 4, map managing unit 1 allocates an access right 10 for allowing the access and correction of a map database DB1, and an access right 20 for allowing the additional loading of a map database DB2. In this way, different access rights are allocated for respective map databases to secure the safety of data stored in the databases. Namely, data are protected from free correction and addition. A basic map processor 2 of FIG. 4 is also realized as a part of a program to execute processes shown in the flowchart of FIG. 6. Given map data is stored in one of the map databases DB1 and DB2, depending on the importance of the map data.

In FIG. 4, a displayed pattern (100) is, for example, a road registration map retrieved by a person in charge of road management. To display the road registration map, the map managing unit 1 loads the road registration map from the map database DB1 to the display. A displayed pattern (200) shows the road registration map and an overlaid land-house managing map corresponding to the area of the road registration map. Unlike the conventional art, other unnecessary maps are not loaded from the databases to the display, so that one can quickly and optionally see a required map.

Figure 6:
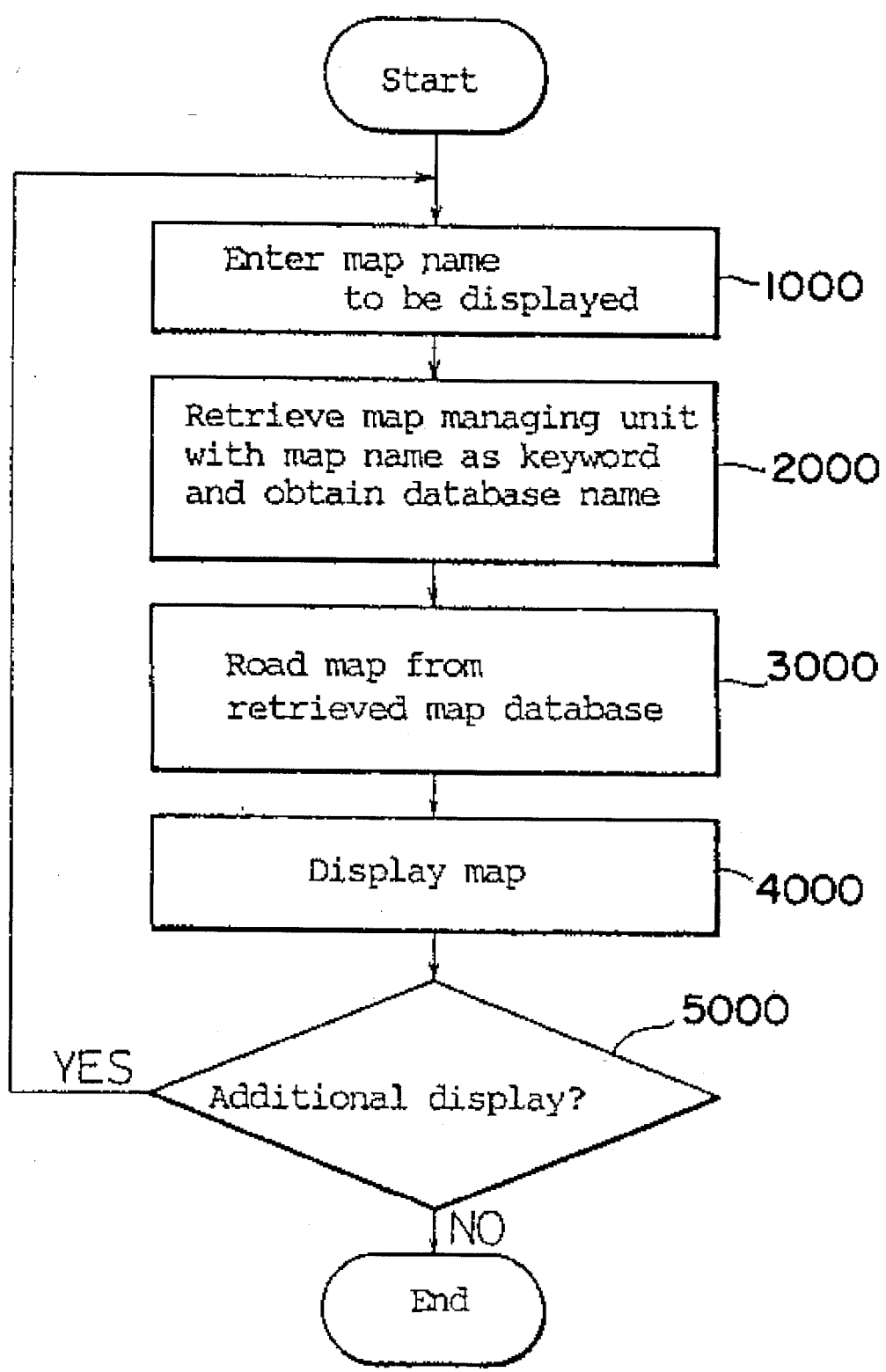
FIG. 6 shows a flow of processes according to the present invention.

FIG. 6 shows processes of the present invention. In step 1000, the name of a map to display is entered through a keyboard. In step 2000, the entered map name is used as a keyword to retrieve the map managing unit 1 and get the name of a database storing the required map. In step 3000, the required map is loaded from the map database to a display. In step 4000, the map is displayed. In step 5000, it is determined whether or not additional data must be displayed. If additional data must be displayed, the flow goes to the step 1000, and if not, the flow ends.

As explained above, a computerized geographic information management system according to the present invention is capable of not only quickly retrieving a map from different map data but also simultaneously retrieving a plurality of maps from the data.

CAPABILITY OF EXPLOITATION IN INDUSTRY

A geographic information management system employs a computer to manage a database of map information and its attribute data, such as data of roads, houses, and place-names. This sort of computerized system is employed by, for example, a municipal corporation which must control enormous kinds of geographic data. Usually, this data is separately controlled by individual departments of the municipal corporation. To reduce the complication of the separate management of geographic data, the present invention provides a geographic information management system that collectively manages different kinds of map data. Namely, the system of the present invention collectively controls data of different departments of an organization. This system is capable of not only quickly retrieving a single map but also simultaneously retrieving a plurality of maps.

I claim:

1. A map management system for a region having first and second attributes, the map management system comprising:

a map managing unit which prepares a first map database corresponding to the first attribute and containing data representing a map of the first attribute, and a second map database corresponding to the second attribute and containing data representing a map of the second attribute, the first and second map databases having respectively corresponding access rights, the map managing unit managing the data contained in the first and second map databases and allowing access to the data in accordance with the corresponding access right of the first and second map databases; and a map processor which accesses the first and second map databases through the map managing unit, retrieves the data contained in the first and second map databases, and displays the retrieved data on a display device, the data contained in the first and second map databases being separately retrievable by the map processor so that the data contained in the first map database can be retrieved without retrieving the data contained in the second map database and so that the data contained in the second map database can be retrieved without retrieving the data contained in the first map database, wherein the first and second map databases each have one of a first corresponding access right which allows data contained in the corresponding map database to be displayed, and a second corresponding access right which allows data contained in the corresponding map database to be displayed and corrected, the map managing unit determining whether data contained in a respective one of the first and second map databases is displayable or displayable and correctable in accordance with the corresponding first or second access right of said one of the first and second map databases.

2. A map management system as in claim 1, wherein the corresponding first or second access rights of the first and second map databases are allocated to the first and second map databases in accordance with the importance of the attributes corresponding, respectively, to the first and second map databases.

\* \* \* \* \*

UNITED STATES PATENT AND TRADEMARK OFFICE
CERTIFICATE OF CORRECTION

Patent No.: 5,543,788
Issue Date: 8/6/96
Inventor : Maki MIKUNI

It is certified that error appears in the above-indentified patent and that said Letters Patent is hereby corrected as shown below:

Title page, item [63], change "Jul. 12" to --Jul. 13--.

Col. 1, line 6, change "Jul. 12" to --Jul. 13--

Signed and Sealed this

Eighteenth Day of February, 1997

Attest:

BRUCE LEHMAN

*Attesting Officer*   *Commissioner of Patents and Trademarks*